Aug. 30, 1960     L. R. MURPHY     2,950,909
TANDEM SCALE SYSTEM
Filed Sept. 10, 1957     2 Sheets-Sheet 1
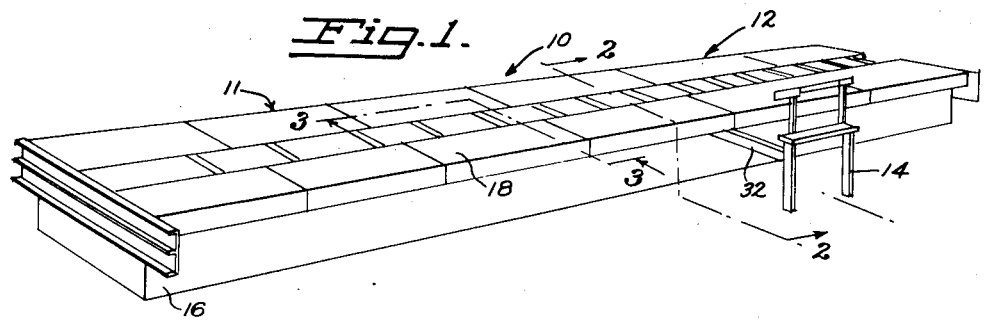
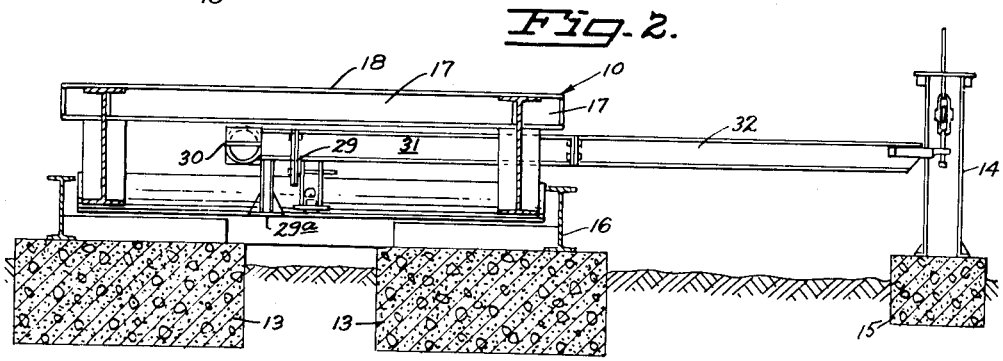
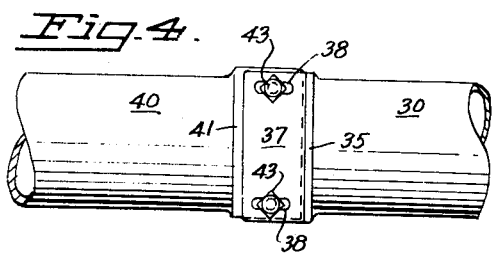
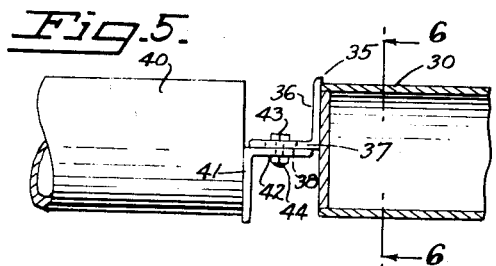
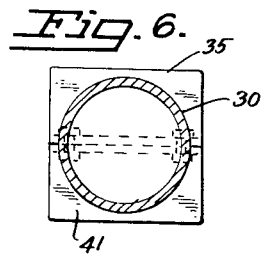
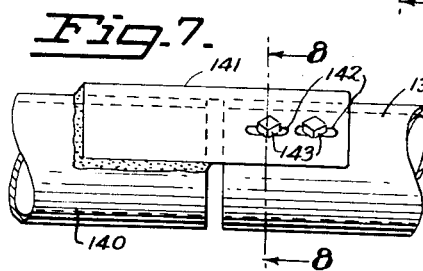
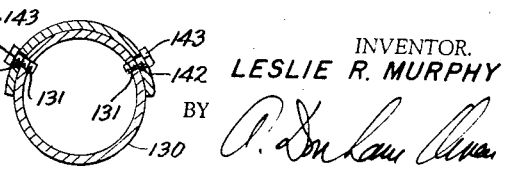
INVENTOR.
LESLIE R. MURPHY
BY
ATTORNEY.

Aug. 30, 1960  L. R. MURPHY  2,950,909
TANDEM SCALE SYSTEM
Filed Sept. 10, 1957

INVENTOR.
LESLIE R. MURPHY
BY
ATTORNEY.

United States Patent Office 2,950,909
Patented Aug. 30, 1960

2,950,909

TANDEM SCALE SYSTEM

Leslie R. Murphy, Sacramento, Calif., assignor to L. R. Murphy Scale Company, Sacramento, Calif., a corporation of California Filed Sept. 10, 1957, Ser. No. 683,050

5 Claims. (Cl. 265—71)

This invention relates to a tandem scale system.

With truck-and-trailer combinations getting longer and longer, the length of the motor truck scales used for weighing them has had to be correspondingly increased. The present invention makes it possible to extend the length of motor-truck scales by joining a series of shorter scales in tandem. A contractor may join a series of scales constructed in accordance with this invention by attaching a connecting member by, say, four bolts for each pair of scales. The scales may be substantially identical or they may be of different platform lengths. My novel construction then lets him take advantage of the full combined length of the scale units, using the scale beam for only one unit to register the total weight. In other words, the contractor may use any of these scales singly and separately, or he may connect them in tandem by means of this invention to provide platform of double, triple, quadruple length.

A problem that had to be solved before tandem connection could become practical was how to get the necessary exact alignment between successive scales. The scale units themselves are standard production items, often bought separately; in fact, the scales to be connected may have been bought several years apart and the alignment problem had to be solved before they could be used in tandem, for it is necessary that the weight be registered accurately.

The present invention has solved this problem by a novel construction which will be better understood from the detailed explanation. In general, it may be said that the lever systems of the separate scales are so joined that only one transverse lever need be used to transmit the lever motion of the entire system to a weighbeam.

Thus, one object of the invention is to provide a practical means for joining two or more scales together in tandem for providing a scale of increased length for weighing very long objects.

Another object of the invention is to provide a tandem scale system in which a plurality of individual scales are connected to a single weighing beam.

Another object of the invention is to provide a tandem scale wherein the connection between the individual scale units accommodates manufacturing and installation tolerances, without affecting the accuracy of the scale.

Another object of the invention is to provide a very practical and economical system for utilizing standard separate scale units in a tandem connection.

Other objects and advantages of the invention will appear from the following description of several preferred forms thereof.

In the drawings:

Fig. 1 is a view in perspective of a tandem scale system comprising two individual scale units connected together and to a single weighbeam system.

Fig. 2 is an enlarged view in end elevation and partly in section, taken along the line 2—2 in Fig. 1.

Fig. 4 is an enlarged plan view showing the end of the connecting pipe of one scale joined to the tandem connecting pipe that links the two scales together, the ends of the pipes being broken off to conserve space.

Fig. 5 is a view in side elevation and partly in section of the elements of Fig. 4.

Fig. 6 is a view in section, taken along the line 6—6 in Fig. 5.

Fig. 7 is a view similar to Fig. 4 of a modified form of the invention.

Fig. 8 is a view in section, taken along the line 8—8 of Fig. 7.

Figure 3:
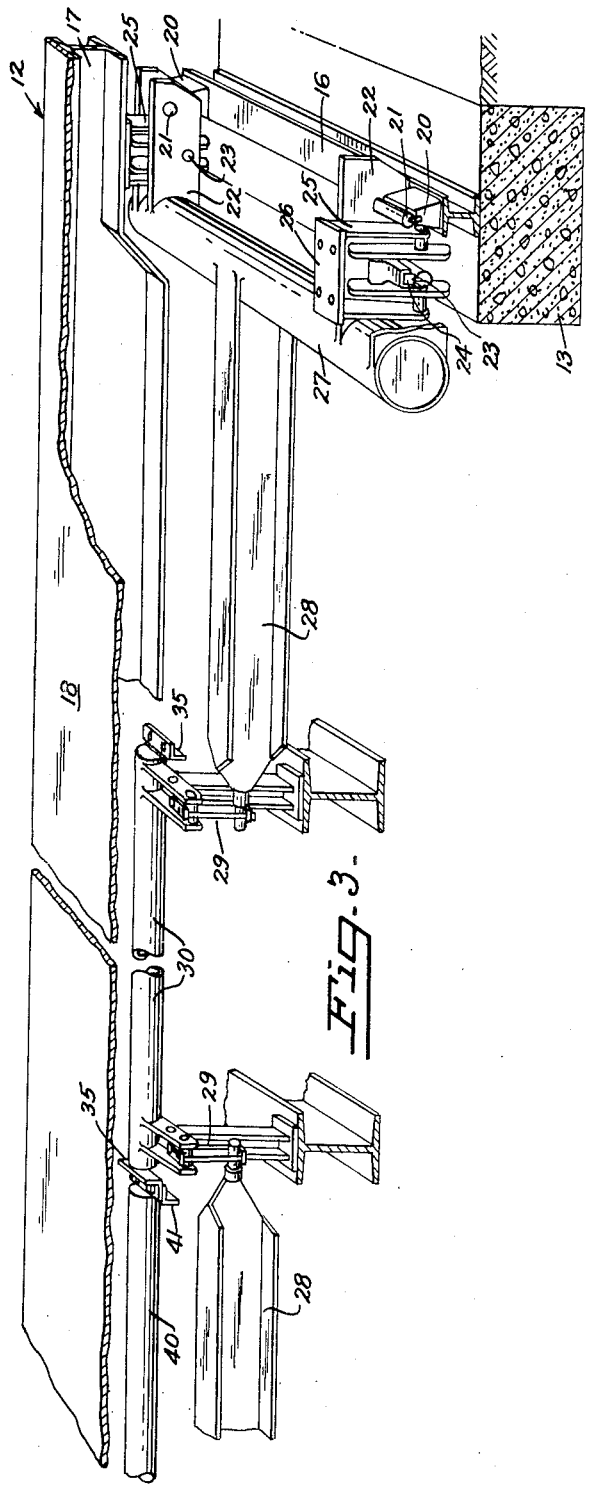
Fig. 3 is an enlarged perspective view of a portion of one scale, partly broken away and partly shown in section to illustrate the lever system of the scales and also showing one tandem connection to the main pipe lever.

The scale 10 shown in Fig. 1 is made up of two standard portable motor truck weighing scales 11 and 12, joined together in tandem according to the principles of this invention. The scales 11, 12 preferably are supported by a solid footing 13, such as concrete, and the weighbeam assembly 14 is preferably also supported by a solid footing 15; however, the installation need not be a permanent one.

Each scale 11, 12 comprises a generally rectangular base frame 16 that rests on the footing 13 and a generally rectangular weighbridge 17 with a platform 18 covering its upper surface. The weighbridge 17 is carried on the base frame 16 by a lever system, best shown in Fig. 3.

The base frame 16 supports a plurality of fulcrums 20 (of a second-class lever). In a simple two-section platform scale there may be one such fulcrum 20 adjacent each of the four corners of the weighbridge on which a knife-edge 21 bears. Multiple section scales have intermediate main levers; so there will be additional fulcrums 20 and knife-edges for them. The knife-edge is rigidly connected to a main lever 22, and each lever 22 supports a second knife-edge 23 on which rests a bearing 24. Double-link suspension, as shown, is preferably used to eliminate platform shock, save the wear on pivots and bearings, and prolong the useful life of the scale. As will appear from Fig. 3, a bracket 25 connected to the bearing 24 has a pad 26 to which is bolted the weighbridge 17. At each end of each scale (and in between, in multiple-type scales), a lateral pipe 27 connects the outboard ends of the two levers 22 at that end. In other words, weight on the platform 18 is exerted on the levers 22 through the bearing 24 and knife-edge 23, to swing the levers 22 about the fulcrum 20 and thereby rotate the pipe 27. A lever member 28 extends lengthwise from each lever 27 and each lever member 28 is connected by a lever and suspension device 29 and fulcrum 29a to one end of a longitudinally extending connecting pipe 30. The pipe 30 thus joins and resolves the forces on all the bearings 24 in the scale, so that pressure on the weighbridge 17 rotates the levers 22 around the fulcrum 20, with the result that the pipe lever 30 is swung about the fulcrum 29a.

The longitudinally extending pipe 30 is connected rigidly to a transversely extending lever arm 31, to which may be connected an extension member 32 that may be connected to a beam outfit, such as the weighbeam assembly 14. When the single scales 11 and 12 are used, used separately, they each have the extension members 32 attached to a separate beam outfit 14. When used as a tandem scale, only one beam outfit 14 is used and the extension member and beam outfit of one of the scales is, therefore, preferably disconnected.

For the purpose of the tandem scale 10, each end of the longitudinally extending pipe 30 is provided with suitable connecting means. This may comprise a short angle iron member 35 welded to the end of the pipe 30 with one face 36 of the angle welded to the pipe 30 and the other face 37 extending in a generally horizontal direction, and provided with two longitudinally extending slotted openings 38. Each end of each pipe 30 is provided in this way, so that either end can be attached to another scale in tandem.

Joining the connecting pipes 30 is a tandem connection pipe 40 having similar angle irons 41 with similar slotted openings 42 connected thereto. If desired, only the openings 42 on this connection pipe 40 need be made slotted and the other openings 38 may be round, or vice versa, but it is well to have only one set of openings 38, or 42, slotted. The slots make it possible to compensate for any differences in manufacturing tolerances or installation tolerances when fitting up the tandem unit. In other words, the two scale frames 16 may be a small fraction of an inch apart when laid end to end, or the tolerances of the parts may add up in such a way that there is a slight difference, so that a perfectly rigid connection, not allowing for this difference in length, would not be operative. Bolts 43 are inserted through the bolt openings 38 and 42 and nuts 44 are threaded on them to secure the pipes 30 and 40 together so that there is, in effect, a single long pipe connecting together all eight of the corners of the two weighbridges 17 (and additional suspension points in multiple lever scales) and conveying the lever motion of the suspension system to the transversely extending lever 31 and, therefore, to the weighbeam 14.

An alternative form of the invention is shown in Figs. 9 and 10, where holes 131 are formed in the pipe 130 and where the tandem connecting pipe 140 has a half-sleeve member 141 welded thereto and extending out therefrom. The half-sleeve, a cylindrical segment 141, has slotted openings 142. Bolts 143 are connected as before. Other means for this are also possible, such as spline connections with slotted openings; the important thing being that there be a rigid connecting member with means for varying the absolute length between the two pipes of the two scales 11, 12.

Thus, each scale 11, 12 may be operated alone in the usual manner, or the two scales 11, 12 may be secured together in tandem for operation according to the principles of this invention. To review this operation: the two scales 11, 12 are simply placed end to end, being aligned with care. When this alignment is completed, the connecting pipe 40 is installed between the facing ends of the longitudinal pipes 30 for the two scales 11 and 12, the difference in length that may be necessary being compensated for by properly moving the slotted openings 38 and 42 and the bolts 43 to fasten them in place. From then on, the two scales 11 and 12 act as one. Usually, the scales 11 and 12 are transported with the weighbeam assembly 14 and extension members 32 separated from the transverse beam 31 and, therefore, only one of these is connected to the scale 10 when it is used in tandem; the other one simply being left apart. Then a truck and trailer can drive up onto the platform 18 of the two-scale unit. A three-scale or four-scale unit, and so on, is made simply by adding the additional scales and additional connecting pipes 40 in exactly the same manner, care being taken always to get careful alignment of the scales to each other and to have them level with respect to each other. This, of course, is but natural—since any one scale, itself, would have to be level—and this merely is called to attention because it should be understood that there will be no problem of twisting, or anything of that nature, when the scales are set up.

When the scales are connected in tandem and a truck and trailer is driven thereon, the weight of the truck and trailer unit depresses the respective weighbridges 17 and acts on the suspension and lever systems. This is accompanied by rotation of the pipes 30 and the connecting pipe 40, and this rotation is transmitted through the transverse lever arm 31 and its extension 32 to the weighbeam 14, where it is indicated.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A tandem scale system, including in combination: a plurality of platform scales placed end to end longitudinally, each scale having a rectangular base frame, a rectangular weighbridge, scale suspension means supporting said weighbridge on said frame, a lever system connected to said suspension means and including lateral members joining elements of said lever system, a longitudinal pipe joining the lateral members into a single system, and a transverse lever arm secured to said pipe; a connecting pipe for each adjoining pair of scales in line with and with its opposite ends aligned with and secured to one end of each of said longitudinal pipes for said pair of scales; and a scale beam assembly connected to one of said transverse lever arms for indicating the total weight on said tandem scale system.

2. The system of claim 1 wherein said connecting pipe and said longitudinal pipes are joined by rigid means providing relative longitudinal adjustment to achieve the exact length between said longitudinal pipes irrespective of manufacturing and installation tolerances involved.

3. In a tandem scale system wherein a plurality of platform scales are placed end to end longitudinally, each scale having a rectangular base frame, a rectangular weighbridge, scale suspension means supporting said weighbridge on said frame, and a lever system connected to said suspension means and including a longitudinal pipe joining portions of the lever system into a single system and a transverse lever arm secured to said pipe; the combination therewith of: first connection means on at least the facing ends of the pipes for each adjacent pair of scales; a connecting pipe having second connection means at its ends, said connection means including bolts and bolt openings, at least one of which is slotted longitudinally for accurate lengthwise rigid conection thereof; and a scale beam assembly conected to one of said transverse lever arms for indicating the total weight on said tandem scale system.

4. The scale system of claim 3 wherein said connection means comprises a pair of angle irons, one secured laterally to the end of said connecting pipe, the other secured laterally to the end of a said longitudinal pipe, said angle irons each having a flange adapted to engage the flange on the other and to provide said bolt openings.

5. The scale system of claim 3 wherein said connection means comprises a cylindrical segment welded around one pipe and projecting longitudinally therefrom and having said slotted bolt openings therethrough and other said bolt openings through the other pipe adapted to align with said slotted ones.

References Cited in the file of this patent

UNITED STATES PATENTS

| 169,630 | Fairbanks | Nov. 9, 1875 |
| 999,386 | Maurer | Aug. 1, 1911 |
| 1,667,894 | Hem | May 1, 1928 |
| 1,894,009 | Starr | Jan. 10, 1933 |
| 2,047,038 | Smith | July 7, 1936 |
| 2,162,622 | Lindsay | June 13, 1939 |
| 2,819,612 | Borgstrom et al. | Jan. 14, 1958 |